V. MULLENDORE.
FLYING MACHINE.
APPLICATION FILED OCT. 31, 1911.
1,019,988.
Patented Mar. 12, 1912.
2 SHEETS—SHEET 1.
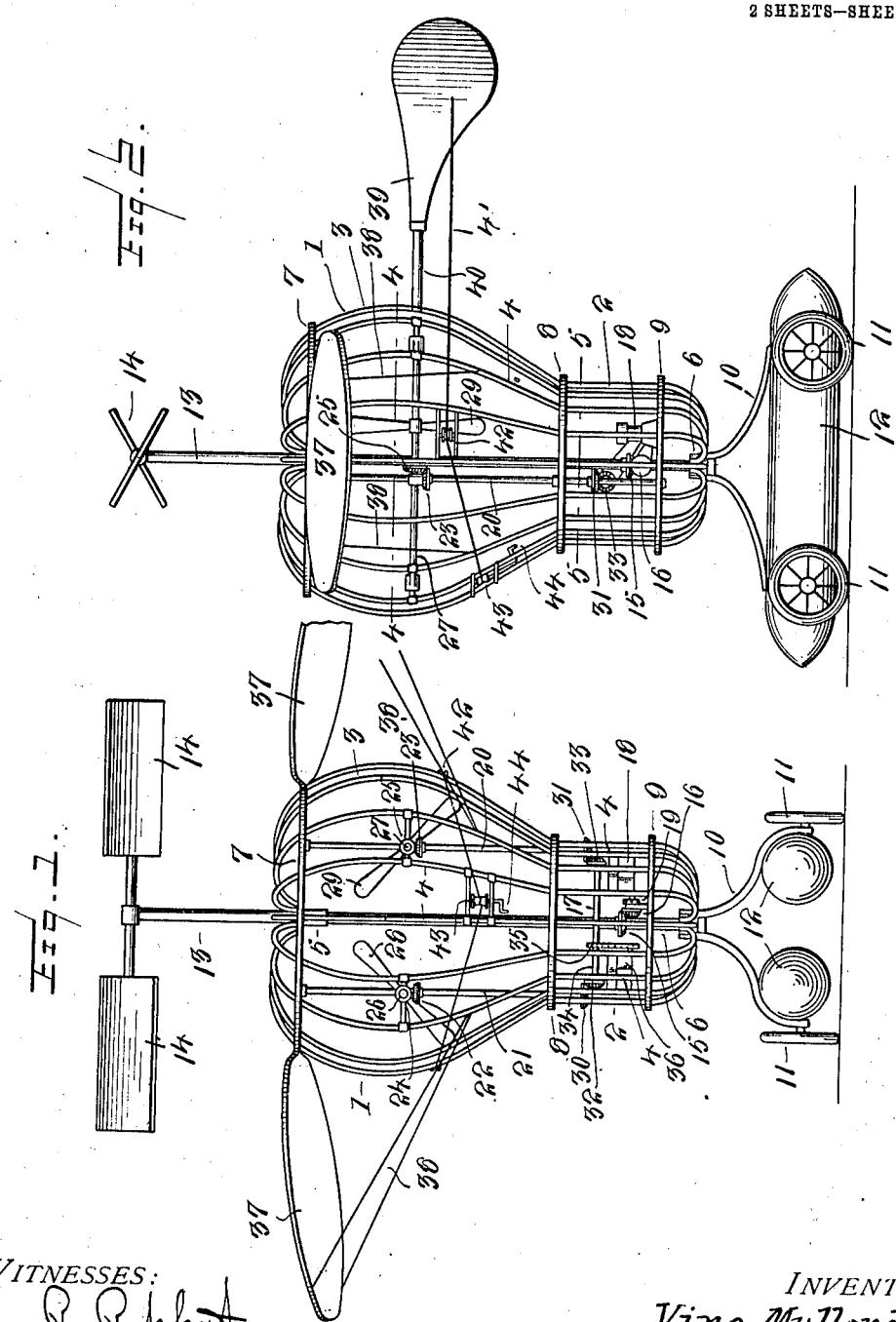
WITNESSES:
E. R. Ruffput
C. M. Gibson
INVENTOR:
Vine Mullendore,
BY C. C. Hines,
Attorney.

V. MULLENDORE.
FLYING MACHINE.
APPLICATION FILED OCT. 31, 1911.
1,019,988.
Patented Mar. 12, 1912.
2 SHEETS—SHEET 2.
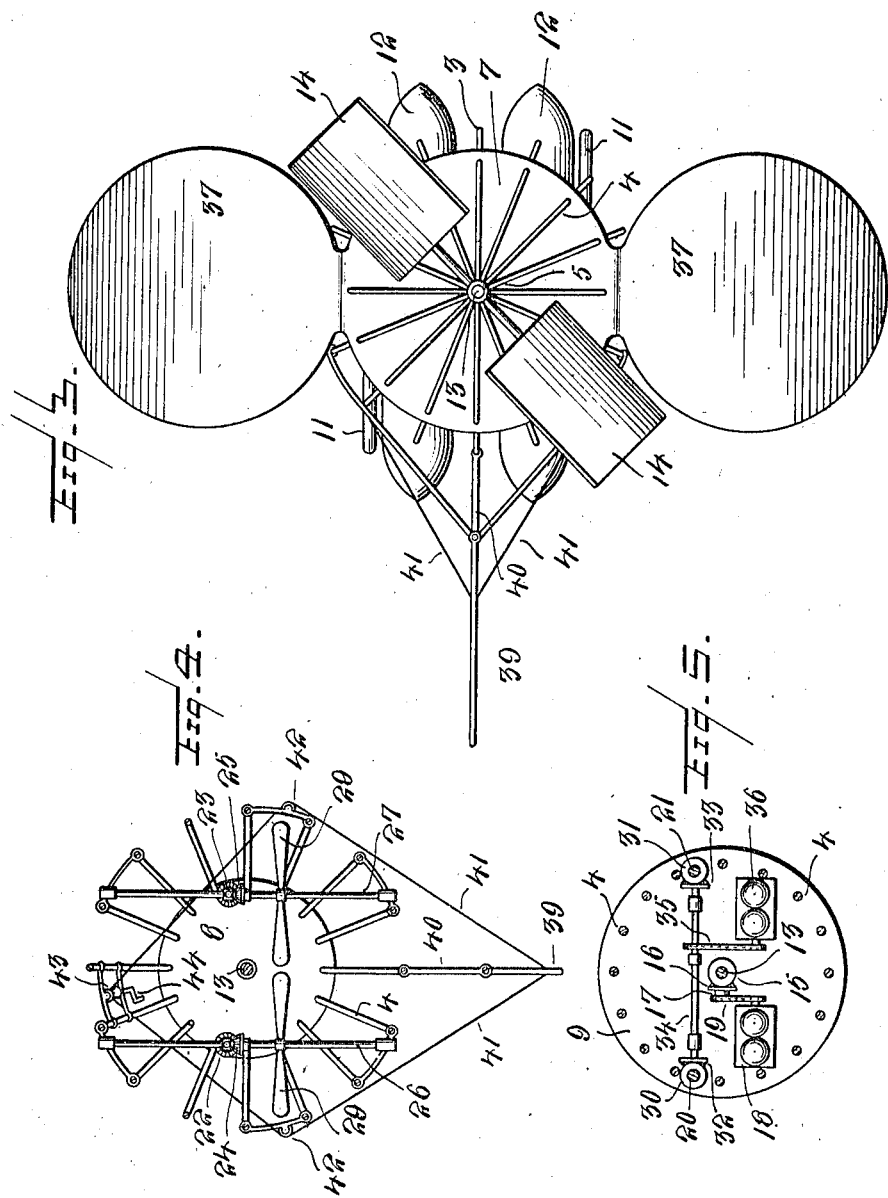
WITNESSES:
INVENTOR:
Vine Mullendore,
BY
Attorney

UNITED STATES PATENT OFFICE.

VINE MULLENDORE, OF DENVER, COLORADO.

FLYING-MACHINE.

1,019,988.  Specification of Letters Patent.  Patented Mar. 12, 1912.

Application filed October 31, 1911. Serial No. 657,817.

*To all whom it may concern:*

Be it known that I, VINE MULLENDORE, a citizen of the United States, residing at Denver, in the county of Denver and State of Colorado, have invented certain new and useful Improvements in Flying-Machines, of which the following is a specification.

My invention relates to flying machines of the aero-dynamical type, and particularly to a combined aeroplane and helicopter, the primary object of the invention being to provide a machine which may be launched directly from the ground, driven horizontally when the desired altitude is reached at any required speed, allowed to descend easily and while under complete control so that safe landings may be made, which may be sustained without forward motion in the air or caused to "hover" over any given point, and which is adapted to be launched from and to alight upon either land or water.

A further object of the invention is to provide a flying machine including a body or car of novel construction, whereby lightness of weight, with strength and durability, is secured and whereby the occupants of the car and drive gearing may be protected from dangerous birds and flying missiles; and further to provide a novel construction and arrangement of supporting surfaces, driving and lifting propellers, and gearing for operating the same, whereby the desired results are attained and safety insured in the operation of aerial craft of this type.

With these and other objects in view, the invention consists of the novel features of construction, combination and arrangement of parts hereinafter described and claimed, reference being had to the accompanying drawings, in which:—

Figure 1 is a front elevation of a flying machine embodying my invention. Fig. 2 is a side elevation of the same. Fig. 3 is a top plan view of the machine. Fig. 4 is a sectional plan view taken on line 4—4 of Fig. 2. Fig. 5 is a similar view taken on line 5—5 of Fig. 2.

In carrying my invention into practice, I provide a machine comprising a substantially pear-shaped body, car or frame 1, having a substantially cylindrical lower cage or compartment 2 and a larger or expanded globular upper cage or compartment 3. This frame, car or body is constructed of spaced rods or tubes 4, arranged to converge at their upper and lower ends, where they are suitably fastened to coupling bearings 5 and 6. The rods also pass through and support, and are connected and braced by, a series of disk-shaped members 7, 8 and 9, the member 7 being mounted upon the rods or tubes at the top of the cage or compartment 3 and forming a central supporting plane or surface, while the members 8 and 9, which may incidentally serve as auxiliary supporting surfaces, are arranged adjacent to the upper and lower ends of the compartment 2 and from decks or platforms, for a purpose hereinafter described. As shown, the coupling bearings 5 and 6 may be reinforced from the members 7 and 9. Suitably attached to the base of the body or car is a chassis or carriage 10 carrying wheels 11 and pontoons or floats 12, whereby the machine is adapted to rest upon and to be launched from and to alight and travel upon either land or water.

Extending vertically and centrally through the body or car and to a suitable elevation above the same is a shaft 13, journaled in the coupling bearings 5 and 6 and in suitable bearing openings in the supporting plane 7 and decks 8 and 9. This shaft carries at its upper end a lifting and sustaining propeller 14 and at its lower end a bevel gear 15, which gear 15 meshes with a similar gear 16 carried by a transmission shaft 17 driven from a motor 18 by a sprocket chain and gearing 19 or other suitable gearing. The propeller 14 may be of any suitable shape and pitch adapted to develop sufficient thrust to lift the machine directly from land or water, and the motor 18 is intended to furnish sufficient power therefor. As shown, said motor 18 is arranged within the cage or compartment 2 and is supported upon the deck or platform 9.

Extending vertically between the deck 9 and plane 7, and through the compartments 2 and 3 and deck 8, are two vertical transmission shafts 20 and 21, journaled in suitable bearings and arranged in transverse alinement on opposite sides of the longitudinal center of the machine. These shafts carry bevel gears 22 and 23 meshing with similar gears 24 and 25 on fore and aft horizontal propeller shafts 26 and 27 carrying driving propellers 28 and 29, whereby said propellers are adapted to be driven to propel the machine forward. The shafts 20 and 21 are also provided with bevel gears 30 and 31 meshing with similar gears 32 and 33 on a horizontal transmission shaft 34 disposed within the cage or compartment 2, which horizontal transmission shaft is driven by a chain and sprocket gearing 35 from a motor 36 supported on the deck or platform 9. Both driving propellers are thus driven from a single motor, which may be of proper power to propel the machine forward at any desired speed. It will be observed that the motors, which may be supplied from suitable source of fuel supply (not shown) within the compartment 2, are so arranged as to give the machine a low center of gravity, whereby maximum stability is insured, the motors and allied parts, in conjunction with the base of the frame, forming a gravity controlled lever which maintains the machine in a perpendicular position against all excess air stresses, so that the machine cannot possibly lose its balance either longitudinally or laterally. In addition, the form of the frame provides for a more equal distribution of the air pressures, thus diminishing its tendency to tilt in any direction from its normal perpendicular position.

In practice, the aviator and passengers, if any, are preferably accommodated in the cage or compartment 3, suitable seats therefor being provided upon the deck or platform 8, and if desired an engineer or mechanician may be housed within the compartment 3, or in lieu thereof, suitable means may be provided to enable the aviator or an attendant within the compartment 3 to control the motors and fuel feed supply.

For use in sustaining the machine, in case of the failure of the lifting propeller mechanism, as well as to give the machine greater supporting capacity, laterally extending supporting wings or planes 37 are provided. These wings or planes project from and form continuations of the central supporting surface 7 and may be of any suitable form and construction to secure an efficient dynamical reaction of the air thereon. Said wings are reinforced from the car or frame by suitable stays 38 and also operate in conjunction with said central supporting surface 7 to assist in sustaining the machine in flight when the lifting and sustaining propeller is working.

The elevation of the machine is controlled by varying the speed of the propeller 14, but an ordinary horizontal rudder for this purpose may be provided and may be particularly employed for more effectually controlling the machine in the event that, from any cause, the propeller 14 is placed out of commission. The surfaces 9 and 37 may also be used as the sole sustaining surfaces when the machine is in driven flight and it is desired to stop the propeller 14 to economize fuel. For horizontal steering a vertical tail rudder 39 is employed and pivotally mounted to swing laterally upon a tail bracket or frame 40. Controlling wires 41 lead from this rudder over suitable guide pulleys 42 to a drum 43 supported within the compartment 3, which drum may be operated by a crank or other controlling element 44, whereby the rudder may be adjusted. The surface 7 may be warped or distorted by suitable controls for steering, balancing or other purposes.

It is apparent that by means of the lifting propeller the machine may be launched directly from the surface of the ground or a body of water and lifted until the desired altitude is reached, after which the driving propellers may be set into action to propel the machine horizontally and the speed of the lifting propeller reduced to a point where said propeller will act in conjunction with the planes to maintain the altitude reached. While the machine is in flight the altitude may, of course, be either increased or diminished by increasing or reducing the speed of the lifting propeller. Upon stopping the driving propellers and regulating the speed of the lifting propeller the machine may be supported at rest in the air or caused to hover over any given point below, or allowed to descend slowly to the earth, so that a safe and easy landing may be made. In the event of the lifting propeller being rendered inoperative it will be understood that the sustaining action of the supporting surfaces will still permit of a gliding landing being made.

Owing to the fact that the aviator and power mechanism are housed within a cage or frame, they are protected from possible serious injury in case the machine should collide with an obstruction on land or water, and also from the attacks of eagles and other large and dangerous birds. By suitably covering the base of the cage the aviator and propelling devices may be shielded from bullets and other flying missiles.

From the foregoing statement, together with the preceding description, the advantages of my improved construction of flying machine will be readily understood and appreciated. The construction and arrangement of parts may, of course, be modified within the spirit and scope of the invention as defined in the appended claims.

I claim:—

1. A flying machine comprising a cage formed of spaced rods or tubes and having a lower contracted portion and an upper expanded portion, a disk supported upon the upper ends of the rods and forming a central sustaining surface, superposed platforms supported upon the lower ends of the rods and dividing the contracted and expanded portions of the cage into compartments, a vertical shaft extending upwardly from the lower compartment above the cage, a lifting propeller carried by said cage, a pair of vertical shafts extending from the lower compartment into the upper compartment, driving propellers within the upper compartment driven from said shafts, wings projecting laterally from said disk or central sustaining surface, and motors supported upon the bottom platform within the lower compartment for respectively driving said shafts.

2. A flying machine comprising a cage formed of spaced rods or tubes and having a lower contracted portion and an upper expanded portion, a disk supported upon the upper ends of the rods and forming a central sustaining surface, superposed platforms supported upon the lower ends of the rods and dividing the contracted and expanded portions of the cage into compartments, a vertical shaft extending upwardly from the lower compartment above the cage, a lifting propeller carried by said cage, a pair of vertical shafts extending from the lower compartment into the upper compartment, fore and aft horizontal shafts within the upper compartment in gear with the respective vertical shafts, driving propellers within said upper compartment and carried by said horizontal shafts, wings projecting laterally from said disk or central sustaining surface, and motors supported upon the bottom platform within the lower compartment for respectively driving said shafts.

3. A flying machine comprising a cage formed of spaced rods or tubes and having a lower contracted portion and an upper expanded portion, a disk supported upon the upper ends of the rods and forming a central sustaining surface, superposed platforms supported upon the lower ends of the rods and dividing the contracted and expanded portions of the cage into compartments, a vertical shaft extending upwardly from the lower compartment above the cage, a lifting propeller carried by said cage, a pair of vertical shafts extending from the lower compartment into the upper compartment, driving propellers within the upper compartment respectively driven from said shafts, wings projecting laterally from said disk or central sustaining surface, a motor within the lower compartment in gear with the lifting propeller shaft, a horizontal transmission shaft in said lower compartment in gear with the pair of vertical shafts, and a second motor in said lower compartment in gear with said transmission shaft.

4. A flying machine comprising a cage formed of spaced rods or tubes and having a lower contracted portion and an upper expanded portion, a disk supported upon the upper ends of the rods and forming a central sustaining surface, superposed platforms supported upon the lower ends of the rods and dividing the contracted and expanded portions of the cage into compartments, a vertical shaft extending upwardly from the lower compartment above the cage, a lifting propeller carried by said cage, a pair of vertical shafts extending from the lower compartment into the upper compartment, fore and aft horizontal shafts within the upper compartment in gear with the respective vertical shafts, driving propellers within said upper compartment and carried by said horizontal shafts, wings projecting laterally from said disk or central sustaining surface, a motor within the lower compartment in gear with the lifting propeller shaft, a horizontal transmission shaft in said lower compartment in gear with the pair of vertical shafts, and a second motor in said lower compartment in gear with said transmission shaft.

5. A flying machine comprising a cage formed of spaced rods or tubes and having a lower contracted portion and an upper expanded portion, a disk supported upon the upper ends of the rods and forming a central sustaining surface, superposed platforms supported upon the lower ends of the rods and dividing the contracted and expanded portions of the cage into compartments, a vertical shaft extending upwardly from the lower compartment above the cage, a lifting propeller carried by said cage, a pair of vertical shafts extending from the lower compartment into the upper compartment, driving propellers within the upper compartment driven from said shafts, a rudder supported by the cage in rear of the upper compartment, a controlling device within said compartment, connections between the same and the rudder, wings projecting laterally from said disk or central sustaining surface, and motors supported upon the bottom platform within the lower compartment for respectively driving said shafts.

In testimony whereof I affix my signature in presence of two witnesses.

VINE MULLENDORE.

Witnesses:
 Louis F. Nell,
 L. B. Hungerford.